(12) United States Patent
Chang

(10) Patent No.: US 6,901,834 B2
(45) Date of Patent: Jun. 7, 2005

(54) MOVEMENT ADJUST DEVICE FOR A CIRCULAR SAW

(76) Inventor: Chin-Chin Chang, No. 41, Nan-Tsun Rd., Hou-Li Hsiang, Taichung Hsien (TW)

( * ) Notice: Subject to any disclaimer, the term of this patent is extended or adjusted under 35 U.S.C. 154(b) by 47 days.

(21) Appl. No.: 10/672,868

(22) Filed: Sep. 26, 2003

(65) Prior Publication Data

US 2005/0066788 A1    Mar. 31, 2005

(51) Int. Cl.$^7$ ................................................. B26D 1/14
(52) U.S. Cl. ..................... 83/486.1; 83/471.3; 83/473; 83/490
(58) Field of Search .................... 83/477, 477.1, 83/471.3, 485, 486.1, 487–489, 508.2, 581; 248/125.1, 448, 670

(56) References Cited

U.S. PATENT DOCUMENTS

| | | | | |
|---|---|---|---|---|
| 2,297,927 A | * | 10/1942 | Whitman | 248/171 |
| 3,174,634 A | * | 3/1965 | Peck | 414/541 |
| 4,869,142 A | * | 9/1989 | Sato et al. | 83/467.1 |
| 5,241,888 A | * | 9/1993 | Chen | 83/471.3 |
| 5,421,228 A | * | 6/1995 | Fukinuki | 83/471.3 |
| 5,438,899 A | * | 8/1995 | Hoyer-Ellefsen | 83/471.3 |
| 5,768,967 A | * | 6/1998 | Sasaki et al. | 83/471.3 |
| 5,819,624 A | * | 10/1998 | Brault et al. | 83/417.3 |
| 5,870,938 A | * | 2/1999 | Brunson et al. | 83/471.3 |
| 6,425,309 B1 | * | 7/2002 | Stumpf et al. | 83/468.2 |
| 6,550,363 B2 | * | 4/2003 | He | 83/471.3 |
| 6,758,123 B2 | * | 7/2004 | Svetlik et al. | 83/471.3 |
| 2004/0200330 A1 | * | 10/2004 | Watson | 83/100 |

* cited by examiner

Primary Examiner—Allan N. Shoap
Assistant Examiner—Carolyn T Blake

(57) ABSTRACT

A movement adjust device for a circular saw includes a holder secured on a base member of the circular saw and having two through holes defined in two opposite ends the holder. Two first guide bars each slidably extends through a corresponding through hole in the holder. Each first guide bar has a first end securely received in a first stopper and a second end securely received in a connector in which two through holes is defined between the second end of each of the two first guide bars. Two second guide bars each slidably extend through a corresponding through hole in the connector. Each second guide bar has a first end securely received in a second stopper and a second end securely received in a third stopper that is secured on a hinge of the circular saw.

7 Claims, 6 Drawing Sheets

MOVEMENT ADJUST DEVICE FOR A CIRCULAR SAW

BACKGROUND OF THE INVENTION

1. Field of the Invention

The present invention relates to a movement adjust device, and more particularly to a movement adjust device for a circular saw. The movement adjust device of the present invention can reduce the necessary operating space of the circular saw.

2. Description of Related Art

A circular saw is widely used for cutting. The circular saw without any movement adjust device only has a short cutting range. As a result, a conventional movement adjust device is provided to overcome the problem of the circular saw. The conventional movement adjust device in accordance with the prior art comprises a holder secured on a rear end of a base member of the circular saw. The holder has two through holes defined to allow two guide bars slidably extending through the holder. Each guide bar has a first end securely received in a first stopper and a second end securely received in a second stopper that is securely mounted to a hinge that is connected to a housing, a motor and a saw blade of the circular saw. Consequently, the saw blade can be moved to elongate the cutting range of the circular saw due to a slidable relation between the holder and the two guide bars.

However, the guide bars extend from the rear portion of the circular saw when the circular saw only needs a short cutting range and the second stopper is backward pushed. Consequently, the conventional movement adjust device needs an operating space having a depth corresponding to the length of the guide bars. It is a inconvenient design when used in a small place.

The present invention has arisen to mitigate and/or obviate the disadvantages of the conventional movement adjust device for a circular saw.

SUMMARY OF THE INVENTION

The main objective of the present invention is to provide an improved movement adjust device of a circular saw. The movement adjust device of the present invention can reduce the necessary operating space of the circular saw.

To achieve the objective, the movement adjust device for a circular saw in accordance with the present invention comprises a holder secured on a base member of the circular saw and having two through holes defined in tow opposite ends the holder. Two first guide bars each slidably extends through a corresponding through hole in the holder. Each first guide bar has a first end securely received in a first stopper to prevent the two guide bars from detaching from the holder and a second end securely received in a connector in which two through holes are defined between the second end of each of the two first guide bars. Two second guide bars each slidably extend through a corresponding through hole in the connector. Each second guide bar has a first end securely received in a second stopper to prevent the two second guide bars from detaching from the connector and a second end securely received in a third stopper that is secured on a hinge of the circular saw.

Further benefits and advantages of the present invention will become apparent after a careful reading of the detailed description with appropriate reference to the accompanying drawings.

DETAILED DESCRIPTION OF THE INVENTION

Figure 1:
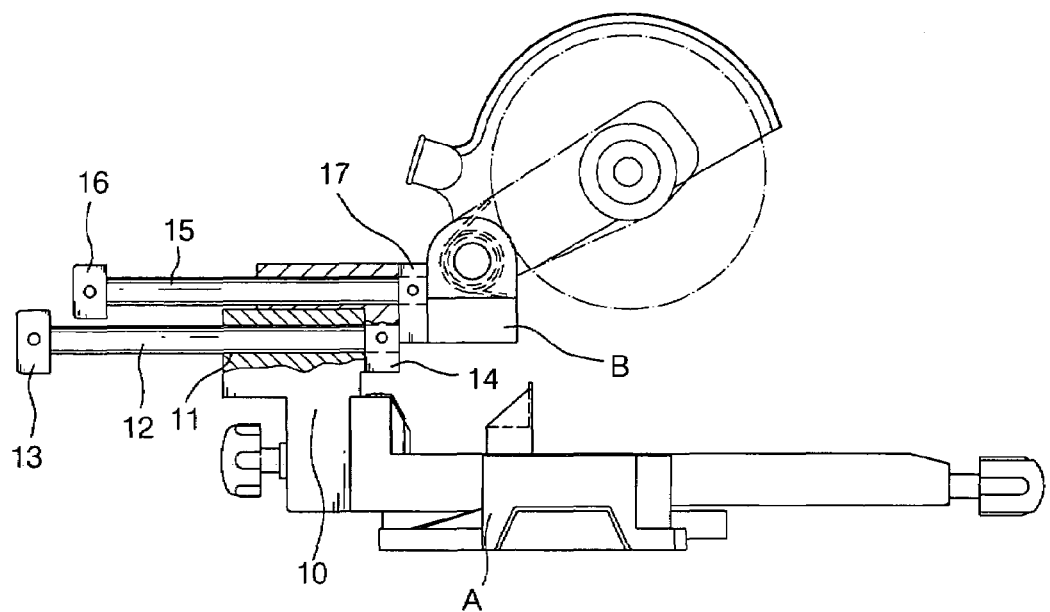
FIG. 1 is a side schematic plan view in partial cross-section of a movement adjust device for a circular saw in accordance with the present invention.
Figure 2:
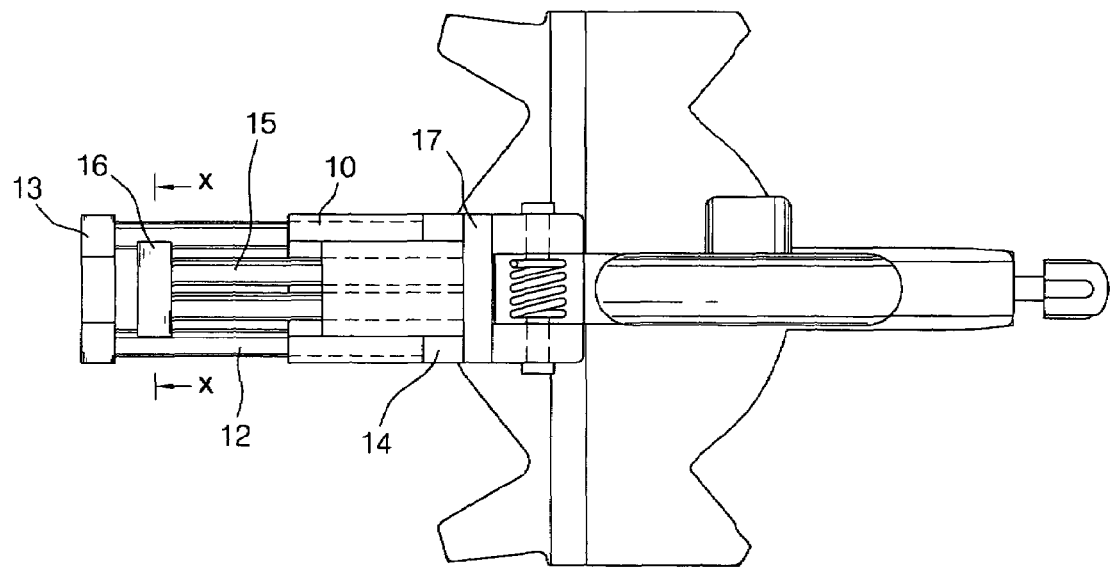
FIG. 2 is a top plan schematic view of the movement adjust device in FIG. 1.
Figure 3:
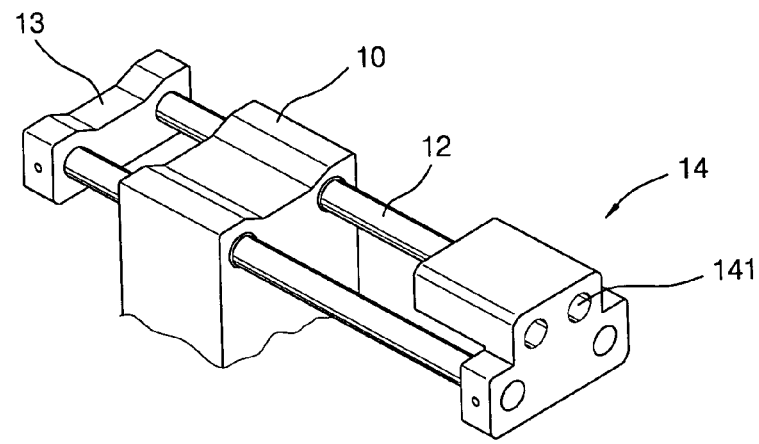
FIG. 3 is a partially perspective view of the movement adjust device in FIG. 1.
Figure 4:
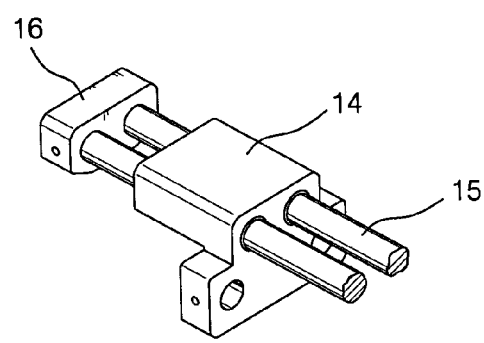
FIG. 4 is a partially perspective view of the movement adjust device in FIG. 1.
Figure 5:
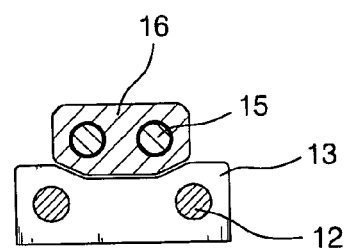
FIG. 5 is a cross-sectional view of the movement adjust device in FIG. 2 along line x—x.

With reference to the drawings and initially to FIGS. 1–5, a movement adjust device for a circular saw in accordance with the present invention comprises a holder (10) adapted to be secured on a rear end of a base member (A) of the circular saw. The holder (10) has two through holes (11) defined in two opposite ends of a top portion of the holder (10). Two first guide bars (12) each slidably extends through a corresponding one of the two through hole (11) in the holder (10). Each first guide bar (12) has a first end securely received in a first stopper (13) to prevent the two first guide bars (12) from detaching from the holder (10) and a second end securely received in a connector (14). The connector (14) has two through holes (141) defined therein between the second ends of the two first guide bars (12). Two second guide bars (15) each slidably extends through a corresponding one of the two through holes (141) in the connector (14). Each second guide bar (15) has a first end corresponding to the first end of each of the two first guide bars (12) and securely received in a second stopper (16) to prevent the two second guide bars (15) from detaching from the connector (14), and a second end securely received in a third stopper (17). The third stopper (17) is adapted to be secured on a hinge (B) to which a motor and a saw blade of the circular saw are mounted.

Figure 6:
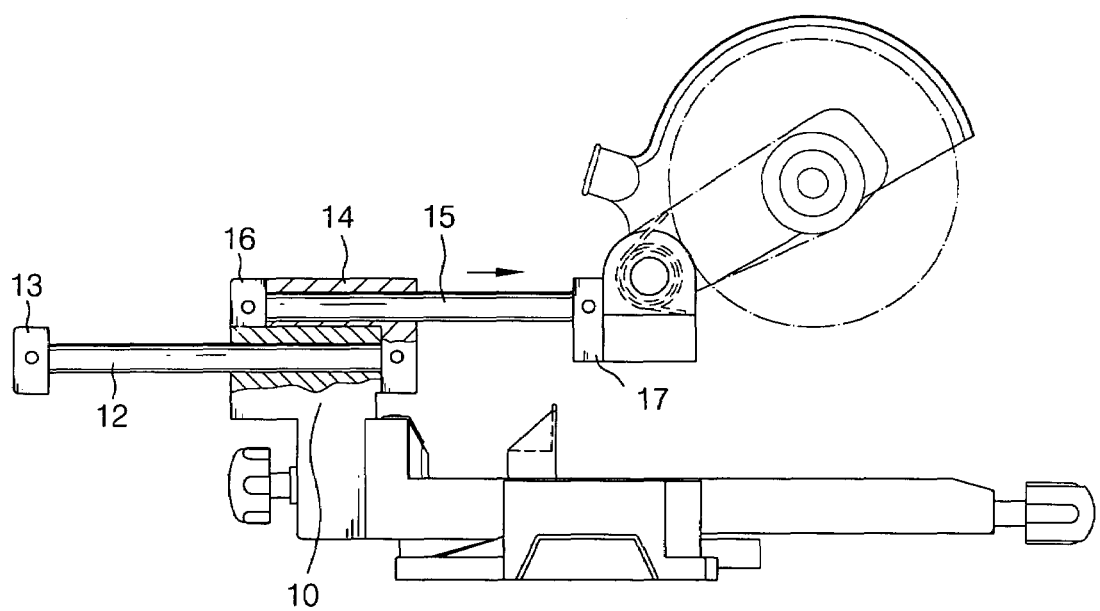
FIG. 6 is an operational side plan view of the movement adjust device in FIG. 1.
Figure 7:
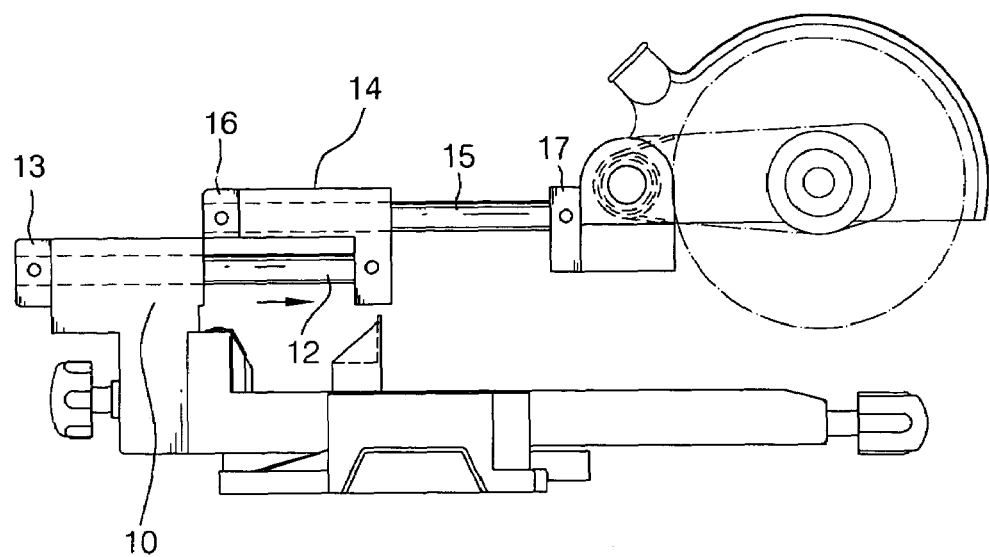
FIG. 7 is an operational side plan view of the movement adjust device in FIG. 1.
Figure 8:
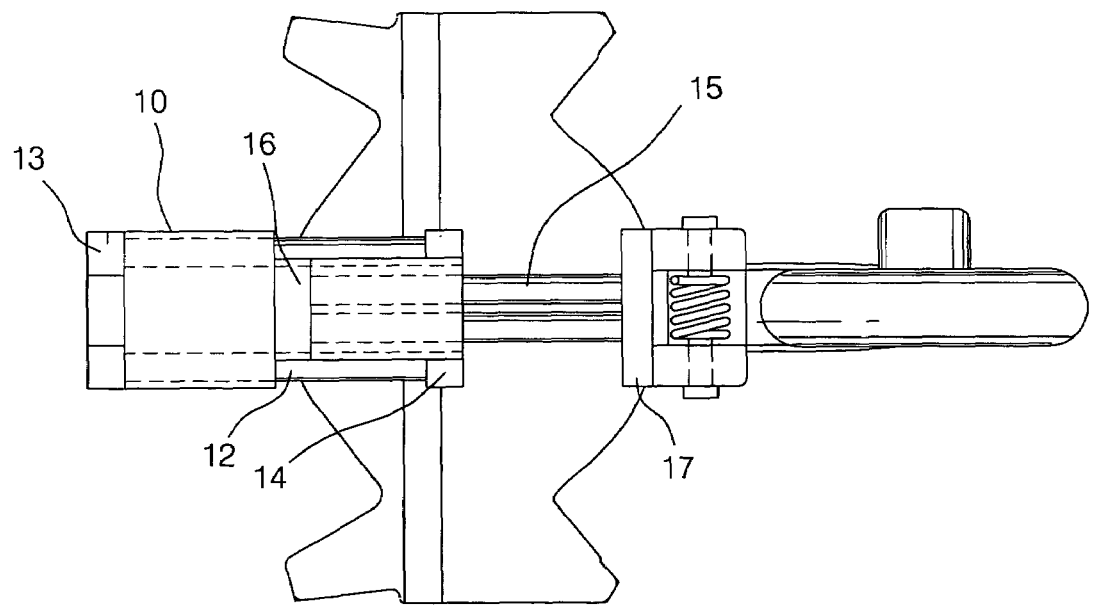
FIG. 8 is an operational top plan view of the movement adjust device in FIG. 7.
Figure 9:
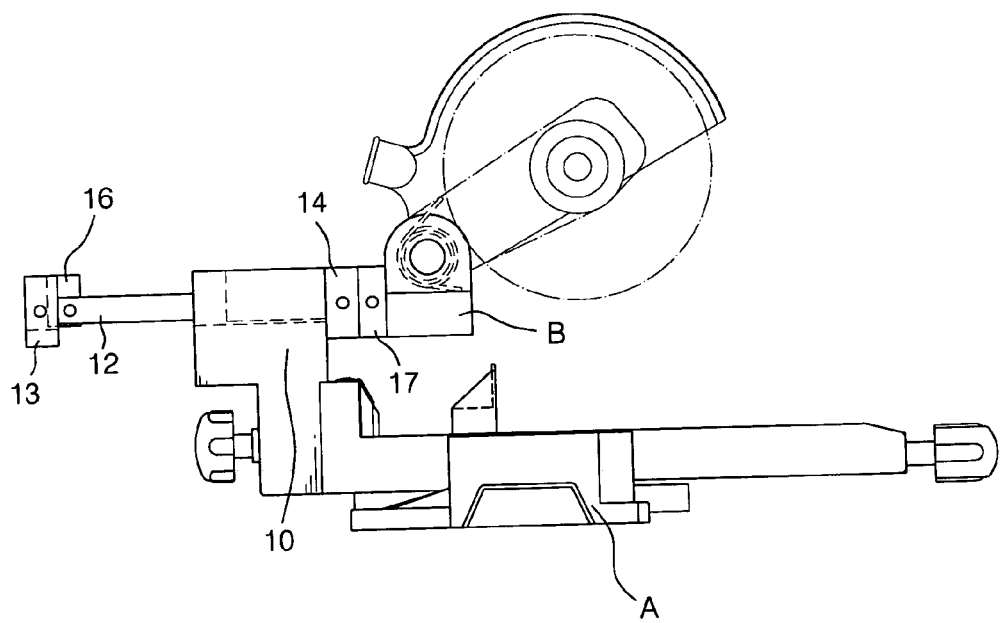
FIG. 9 is a side schematic plan view of a second embodiment of a movement adjust device for a circular saw in accordance with the present invention.
Figure 10:
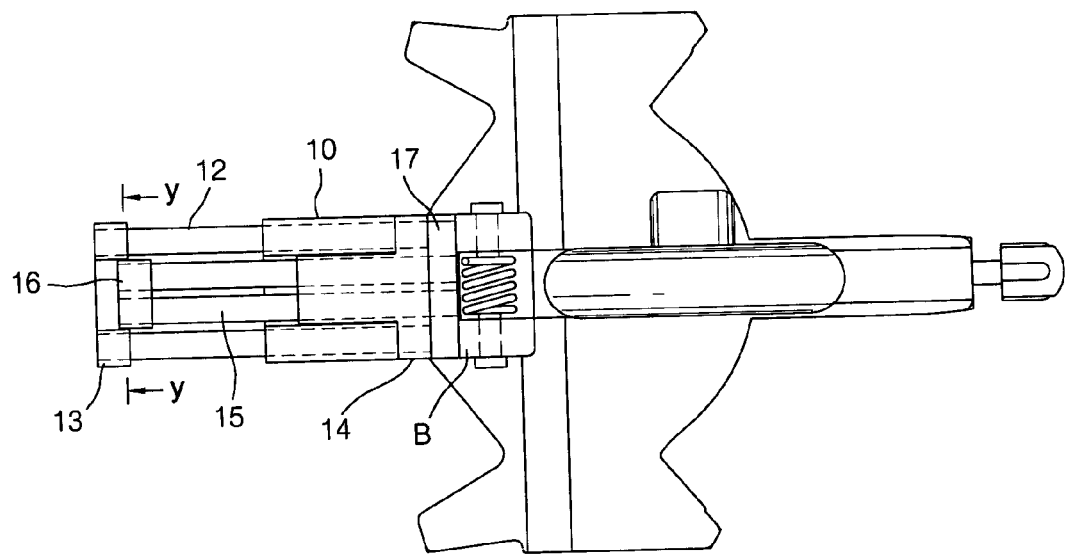
FIG. 10 is a top schematic plan view of the movement adjust device in FIG. 9.
Figure 11:
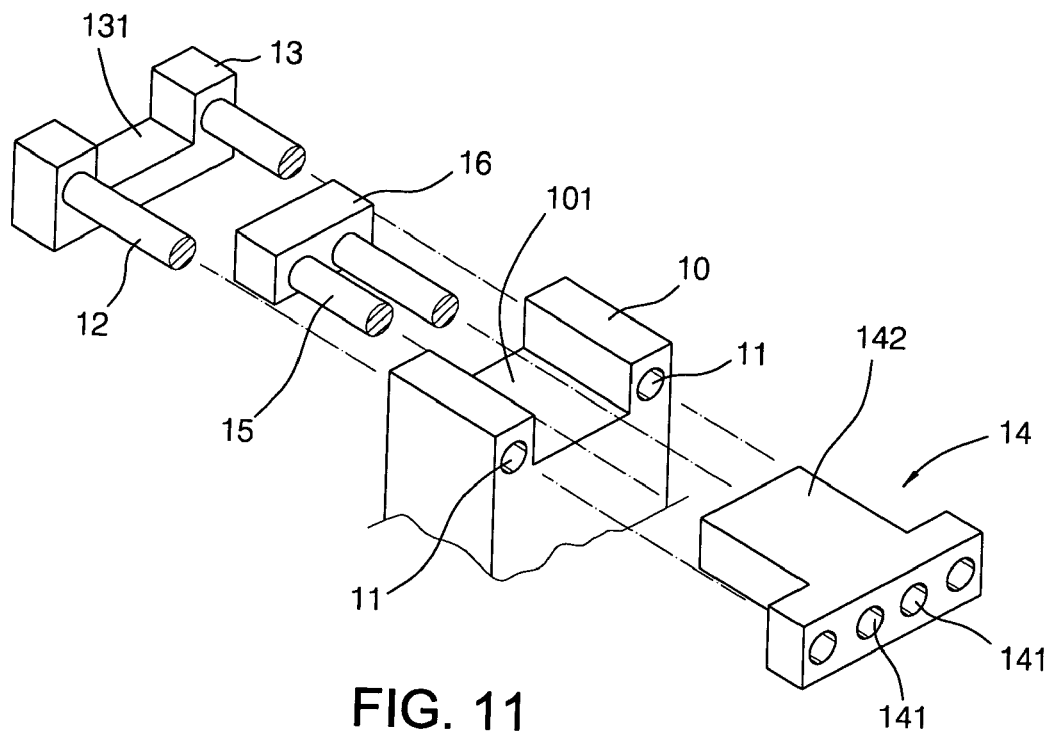
FIG. 11 is a partially exploded perspective view of the movement adjust device in FIG. 9.
Figure 12:
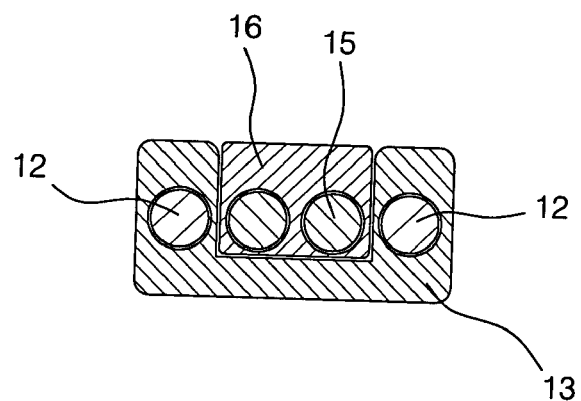
FIG. 12 is a cross-sectional view of the movement adjust device in FIG. 10 along line y—y.

With reference to FIG. 6, the operator can pull the housing of the circular saw and the first guide bars (12) and the second guide bars (15) extend toward the operator when the workpiece has a great size or needs a long distance cutting. With reference to FIGS. 7 and 8, in the preferred embodiment of the present invention, the friction force between the second guide bars (15) and the connector (14) is smaller than that between the first guide bars (12) and the holder (10). Consequently, the second guide bars (15) extend toward the operator when the operator pulls the housing of the circular saw. The first guide bars (12) extend toward the operator when the operator continually pulls the housing to make the second stopper (16) abut and drive the connector (14) to pull the first guide bars (12) toward the operator because the second end of each of the two first guide bars (12) is securely received in the connector (14). The first stopper (13) can prevent the two first guide bars (12) from detaching from the holder (10).

As described above, the guide bars of conventional movement adjust device is divided into two portions respectively corresponding to the first guide bars and the second guide bars. Consequently, the depth of the operating space is shortened because first guide bars (12) and the second guide bars (15) are telescopically moved relative to each other. Furthermore, the number of guide bar of the present invention is double to the conventional movement adjust device such that the present invention can provide a stable support to the circular saw when the first guide bars (12) and the second guide bars (15) extend for a long distance cutting of the circular saw.

With reference to FIGS. 9–12 that show a second embodiment of the movement adjust device for a circular saw, in the embodiment, the holder (10) has a first channel (101) defined in the top portion thereof between the two through holes (11) and the two second guide bars (15) pass through the first channel (101) in the holder (10). The first stopper (13) has a second channel (131) defined in a top portion thereof for selectively partially receiving the second stopper (16). The second stopper (16) flushes with the top portion of the first stopper (13) when received in the second channel (131) in the first stopper (13). The connector (14) has a protrusion (142) extending therefrom toward the holder (10). The protrusion (142) of the connector (14) is selectively received in the first channel (101) in the holder (10) and flushed with the top portion of the holder (10). The two through holes (141) in the connector (14) horizontally correspond to the two first guide bars (12). Consequently, the connector (14) and the holder (10) look like a one-piece element when the protrusion (142) of the connector (14) is received in the first channel (101) in the top portion of the holder (10). As a result, the height of the movement adjust device of the present invention is the same as the conventional movement adjust device, but has better structure than that of the conventional movement adjust device.

Although the invention has been explained in relation to its preferred embodiment, it is to be understood that many other possible modifications and variations can be made without departing from the spirit and scope of the invention as hereinafter claimed.

What is claimed is:

1. A movement adjust device for a circular saw, comprising:
   a holder adapted to be secured on a rear end of a base member of the circular saw, the holder having two through holes defined in two opposite ends of a top portion of the holder;
   two first guide bars each slidably extending through a corresponding one of the two through holes in the holder, each first guide bar having a first end securely received in a first stopper to prevent the two first guide bars from detaching from the holder and a second end securely received in a connector in which two through holes are defined between the second end of each of the two first guide bars; and
   two second guide bars each slidably extending through a corresponding one of the two through holes in the connector, each second guide bar having a first end corresponding to the first end of each of the two first guide bars and securely received in a second stopper to prevent the two second guide bars from detaching from the connector, and a second end securely received in a third stopper, the third stopper adapted to be secured on a hinge to which a motor and a saw blade of the circular saw are mounted.

2. The movement adjust device as claimed in claim 1, wherein the holder comprises a first channel defined in the top portion thereof between the two through hole in the holder and the two second guide bars pass through the first channel in the holder, the connector having a protrusion extending therefrom toward the holder, the protrusion selectively received in the first channel in the holder and flushed with the top portion of the holder.

3. The movement adjust device as claimed in claim 1, wherein the first stopper has a second channel defined in a top portion thereof for selectively partially receiving the second stopper, the second stopper flushed with the top portion of the first stopper when received in the second channel.

4. The movement adjust device as claimed in claim 2, wherein the first stopper has a second channel defined in a top portion thereof for selectively partially receiving the second stopper, the second stopper flushed with the top portion of the first stopper when received in the second channel.

5. The movement adjust device as claimed in claim 2, wherein the two through holes in the connector horizontally correspond to the two first guide bars.

6. The movement adjust device as claimed in claim 3, wherein the two through holes in the connector horizontally correspond to the two first guide bars.

7. The movement adjust device as claimed in claim 4, wherein the two through holes in the connector horizontally correspond to the two first guide bars.

* * * * *